(12) United States Patent
Amacker

(10) Patent No.: US 6,336,520 B1
(45) Date of Patent: Jan. 8, 2002

(54) TREE STAND WITH ADJUSTABLE JACK PLATE FOR LEVELING

(75) Inventor: Joseph A. Amacker, Rayville, LA (US)

(73) Assignee: J. Michael Hart, Monroe, LA (US)

( * ) Notice: Subject to any disclaimer, the term of this patent is extended or adjusted under 35 U.S.C. 154(b) by 0 days.

(21) Appl. No.: 09/493,650

(22) Filed: Jan. 28, 2000

(51) Int. Cl.$^7$ ............................. E04G 3/00; A63B 27/00
(52) U.S. Cl. ....................................... 182/187; 182/135
(58) Field of Search ............................... 182/134, 135, 182/187, 188, 116, 20

(56) References Cited

U.S. PATENT DOCUMENTS

| | | | | |
|---|---|---|---|---|
| 3,856,111 | A | | 12/1974 | Baker .......................... 182/135 |
| 3,955,645 | A | | 5/1976 | Dye ............................ 182/135 |
| 3,960,240 | A | | 6/1976 | Cotton ......................... 182/20 |
| 4,321,983 | A | | 3/1982 | Nelson ......................... 182/136 |
| 4,331,216 | A | | 5/1982 | Amacker ....................... 182/135 |
| 4,603,757 | A | * | 8/1986 | Hollinger ...................... 182/187 |
| 4,727,961 | A | * | 3/1988 | Dawson ........................ 182/187 |
| 4,802,552 | A | | 2/1989 | Williams ....................... 182/187 |
| 5,090,504 | A | | 2/1992 | Amacker ....................... 182/134 |
| 5,143,177 | A | * | 9/1992 | Smith .......................... 182/187 |
| 5,156,236 | A | | 10/1992 | Gardner et al. ................. 182/187 |
| 5,379,861 | A | | 1/1995 | Amacker ....................... 182/187 |
| 5,439,074 | A | * | 8/1995 | Trout et al. ................... 182/187 |
| 5,462,135 | A | * | 10/1995 | Ambler et al. .................. 182/187 |
| 5,562,180 | A | * | 10/1996 | Herzog et al. .................. 182/187 |
| 5,642,789 | A | | 7/1997 | Maxwell ....................... 182/135 |
| 6,085,868 | A | * | 7/2000 | Anthony et al. ................. 182/187 |

FOREIGN PATENT DOCUMENTS

WO        WO 93/13697        7/1993

\* cited by examiner

Primary Examiner—Daniel P. Stodola
Assistant Examiner—Hugh B. Thompson
(74) Attorney, Agent, or Firm—Blank Rome Comisky & McCauley LLP

(57) ABSTRACT

A tree stand for use in hunting or the like has a vertical member with two platforms attached to it to provide a seat and a foot rest. A jack plate is pivotally attached to the back of the vertical member. The jack plate is securely fastened to a tree trunk or limb. The angle between the vertical member and the jack plate is adjusted with an adjustment strap connecting the two. By adjustment of that angle, the vertical member can be maintained in a vertical position regardless of the angle of the trunk or limb to which the jack plate is fastened.

22 Claims, 4 Drawing Sheets

TREE STAND WITH ADJUSTABLE JACK PLATE FOR LEVELING

FIELD OF THE INVENTION

The present invention is directed to a stand for supporting a person such as a hunter on a pole, the trunk of a tree, or the like and is more particularly directed to such a stand that is easy to attach to or mount on tree trunks or poles having variable inclinations relative to vertical. Throughout this application, it will be understood that a disclosure of the use of the stand on a tree trunk or limb covers the use of the stand on a pole and vice versa and that the stand can be used on any similarly shaped support.

DESCRIPTION OF RELATED ART

Various stands for supporting hunters on trees are known in the art. Variations on such stands as developed by the inventor of the present invention are disclosed in U.S. Pat. Nos. 4,331,216, 5,090,504, and 5,379,861 and in the PCT publication WO 93/13697 A1, the disclosures of which are incorporated by reference herein.

A tree stand typically has upper and lower platforms, functioning as a seat and a foot rest respectively, intended to be maintained in a spaced-apart and parallel relationship. The platforms are secured to a tree in one of various ways, such as by a strap or a pair of jaws extending around the tree trunk from each of the platforms.

However, trees do not necessarily grow vertically. Instead, soil or wind conditions or the like can force trees to grow at an angle. Also, it is often desirable to attach the stand to a limb of a tree rather than to the trunk. Therefore, on each of the platforms, the strap or the pair of jaws must be given enough slack to allow the platform to be suspended in a horizontal orientation without compromising safety. Such adjustment can be tricky and must be performed twice, once for each platform.

SUMMARY OF THE INVENTION

It will be readily apparent from the foregoing that a need exists in the art for a tree stand which can be easily and safely attached to a tree trunk or limb, regardless of the orientation of the tree trunk or limb.

Therefore, it is a primary object of the present invention to provide a tree stand which can be safely and easily attached to a tree trunk or limb having any orientation from vertical to horizontal.

It is another object of the present invention to provide a such a tree stand in which an attachment mechanism holds the tree stand onto the tree trunk or limb without any need to leave slack to accommodate a tilt of the tree trunk or limb.

It is still another object of the present invention to provide such a tree stand in which the platforms do not have to be adjusted separately.

To achieve the above and other objects, the present invention is directed to a tree stand having an adjustable jack plate for leveling the tree stand. The platforms are attached to a vertical member, which in turn is pivotally attached to the jack plate. The parts of the jack plate and the vertical member which are remote from the pivot point are held together by an adjustment strap. The vertical member and the jack plate can assume any relative orientation, while the platforms are held by the vertical member to be perpendicular to the vertical member and thus parallel to each other. The jack plate is held onto the tree trunk or limb by straps or another suitable attachment mechanism.

In use, the tree stand is attached to the trunk or limb so that the jack plate is held tightly onto the trunk or limb in parallel thereto. The adjustment strap is adjusted so that the vertical member is disposed vertically and the platforms are disposed horizontally. Thus, the tree stand is held securely onto the tree by the jack plate, while the vertical member and the platforms are in their correct orientations to be usable.

BRIEF DESCRIPTION OF THE DRAWINGS

A preferred embodiment of the present invention will be set forth in detail with reference to the drawings, in which.

DETAILED DESCRIPTION OF THE PREFERRED EMBODIMENT

Figure 1:
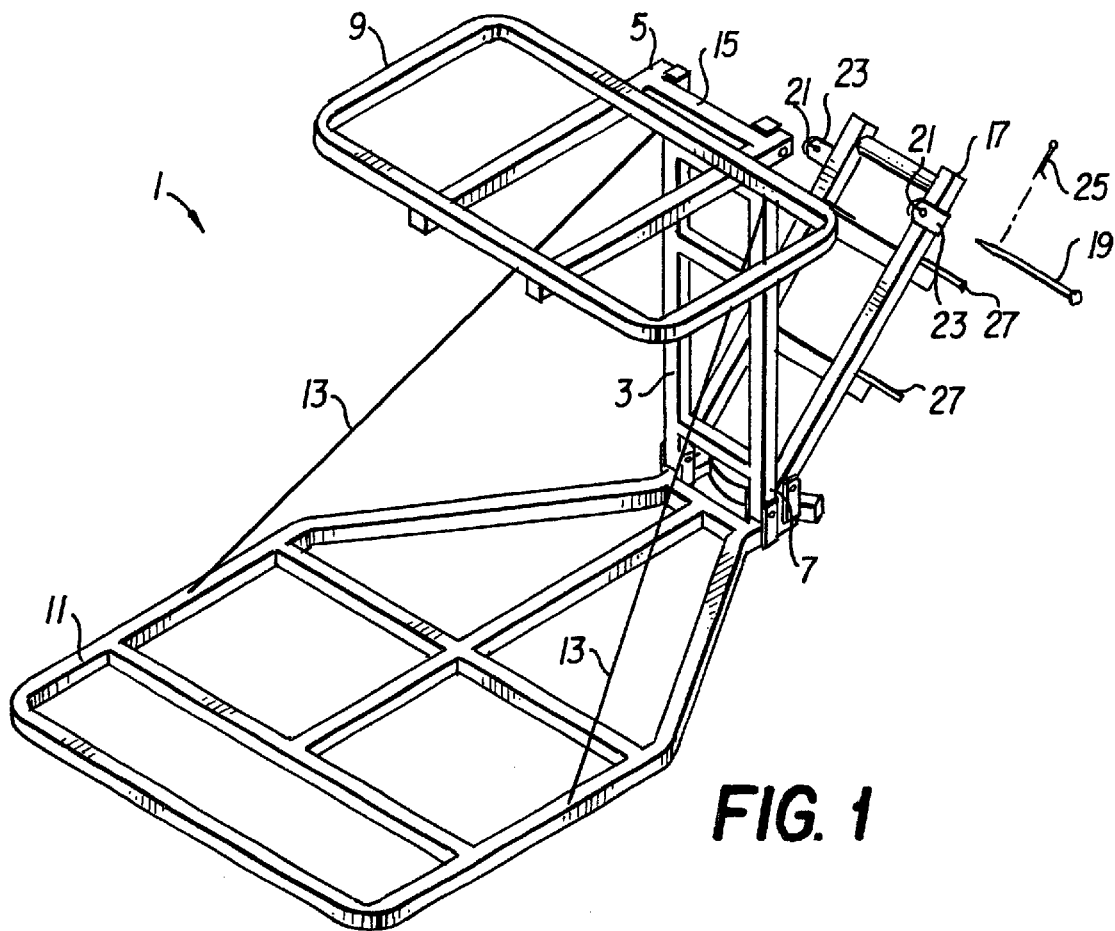
FIG. 1 is a front perspective view of a tree stand according to a preferred embodiment of the present invention.

A preferred embodiment and an alternative embodiment of the present invention will now be set forth in detail with reference to the drawings, in which like reference numerals refer to like components throughout.

Figure 2:
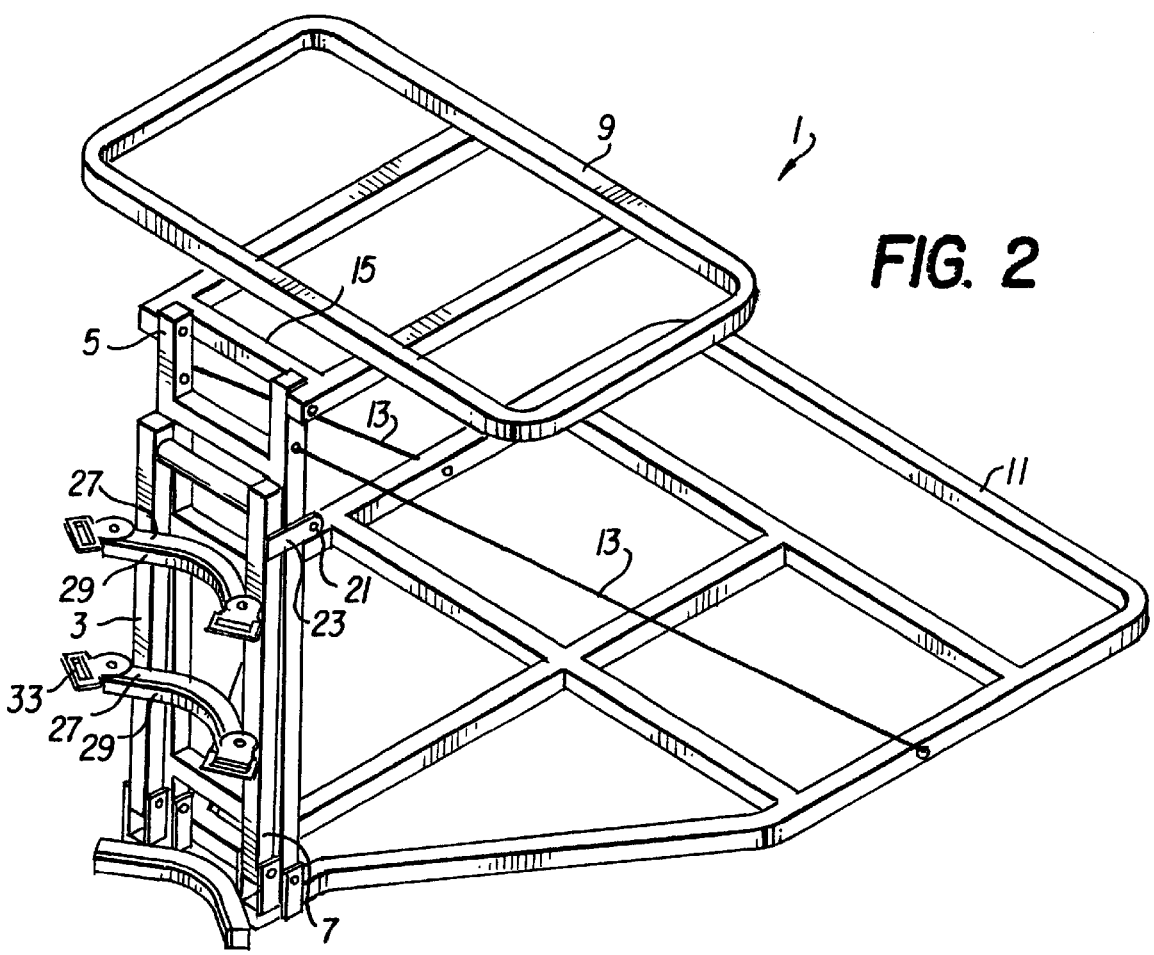
FIG. 2 is a rear perspective view of the same tree stand.

FIGS. 1 and 2 show front and rear perspective views, respectively, of a tree stand according to the preferred embodiment. As shown in FIGS. 1 and 2, the tree stand 1 has a vertical member 3 with an upper end 5 and a lower end 7. An upper platform or seat 9 is pivotally attached to the vertical member 3 at its upper end 5, while a lower platform or foot rest 11 is pivotally attached to the vertical member 3 at its lower end 7.

The platforms 9 and 11 are typically covered with an expanded metal mesh or the like, which is not shown in the drawings for the sake of clarity. Also, support cords 13 can be provided between the vertical member 3 and the lower platform 11.

When the tree stand is folded for storage or transportation, the platforms 9 and 11 are oriented to be parallel to the vertical member 3. When the vertical member 3 is disposed in its upright position, gravity urges the platforms 9 and 11 downward such that the platforms 9 and 11 are both perpendicular to the vertical member 3. Once the platforms 9 and 11 are in their perpendicular positions, a bar 15 on the upper platform 9 abuts against the vertical member 3, and the support cords 13 between the vertical member 3 and the lower platform 11 become taut. Thus, the platforms 9 and 11 are held in their perpendicular positions against gravity. Alternatively, the lower platform 11 could be provided with a bar like the bar 15 of the upper platform 9.

Also pivotally attached to the lower end 7 of the vertical member 3 is a jack plate 17. When the tree stand 1 is folded, the jack plate 17 is held against the vertical member 3 by a pin 19 extending through holes 21 in arms 23 of the jack plate 17 and held in place with a keeper 25.

Figure 3:
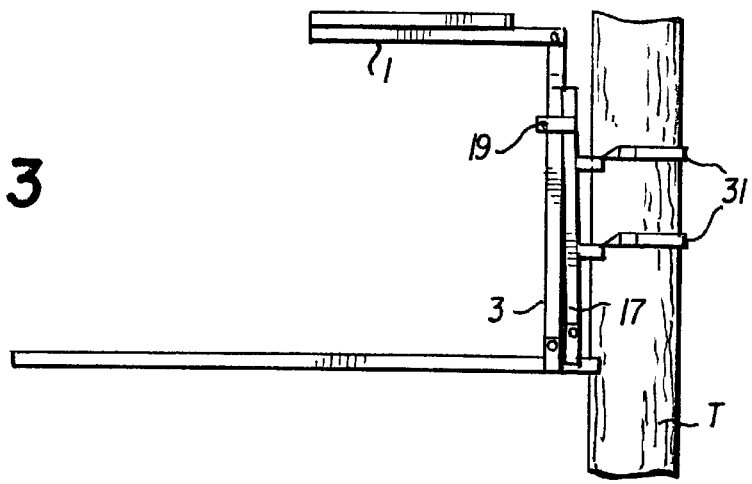
FIGS. 3–5 show the same tree stand attached to tree trunks or limbs growing at various angles.
Figure 4:
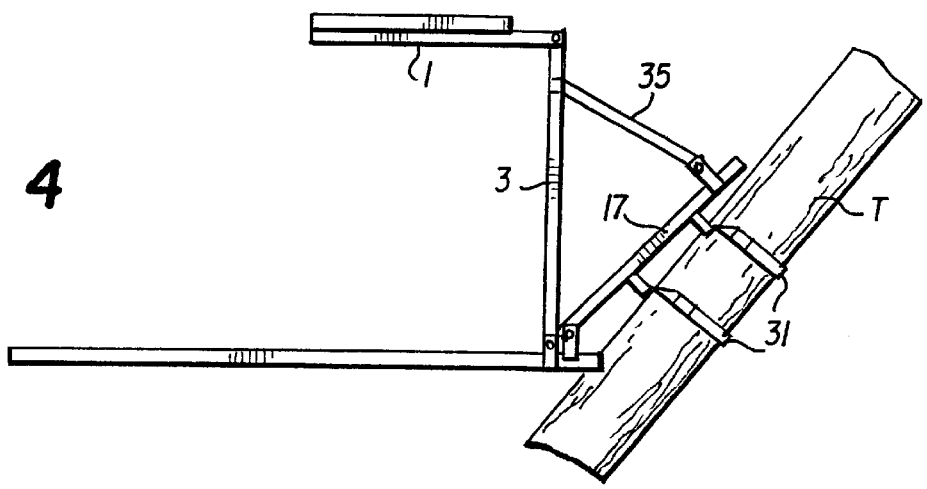
Figure 5:
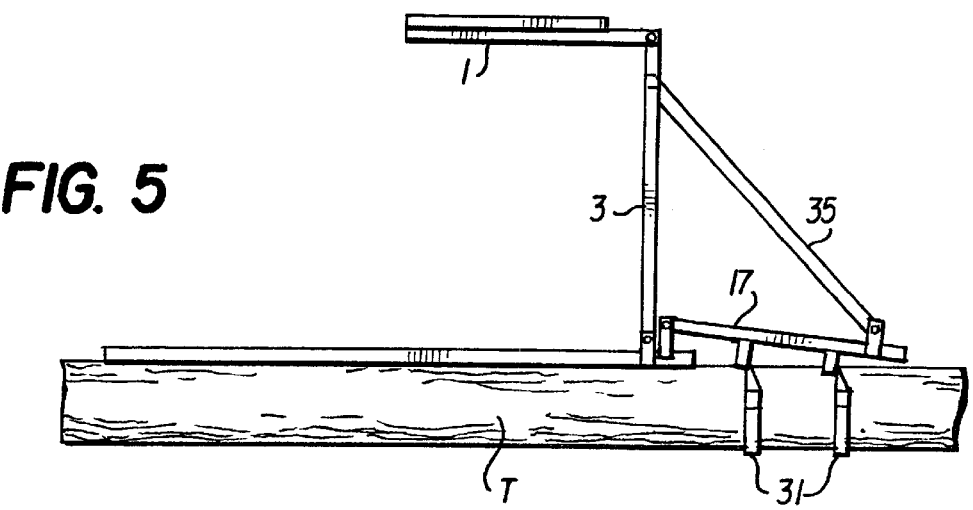

The jack plate 17 has tree attachment members 27 for abutting against the trunk or limb. The tree attachment members 27 can be lined with rubber pads 29 for compliance with tree-damage laws. As shown in FIGS. 3–5, straps 31 are wrapped around the trunk or limb T to secure the jack plate 17 against the trunk or limb T. Each tree attachment member 27 has buckles 33 for receiving the straps 31.

The tree stand 1 just described is used as shown in FIGS. 3–5. When the tree stand 1 is attached to a vertical trunk T, as shown in FIG. 3, the pin 19 is kept in place. When the tree stand 1 is attached to a trunk or limb T which is not vertical, as shown in FIGS. 4 and 5, the keeper 25 is removed from the pin 19, which is then slid out from the holes 21 in the arms 23 of the jack plate 17. The jack plate 17 is free to pivot relative to the vertical member 3. An adjustment strap 35 extending between the jack plate 17 and the vertical member 3 is adjusted to hold the vertical member 3 in a vertical position. Thus, the jack plate 17 is held securely against the tree trunk or limb T, with no need to provide any slack to keep the vertical member 3 vertical.

Figure 6:
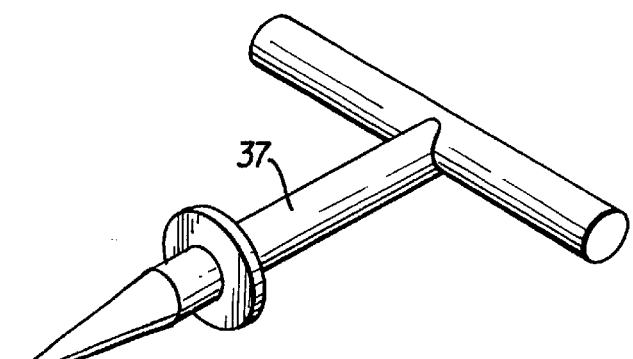
FIG. 6 shows a screw used for mounting an alternative embodiment of the present invention onto a tree.
Figure 7:
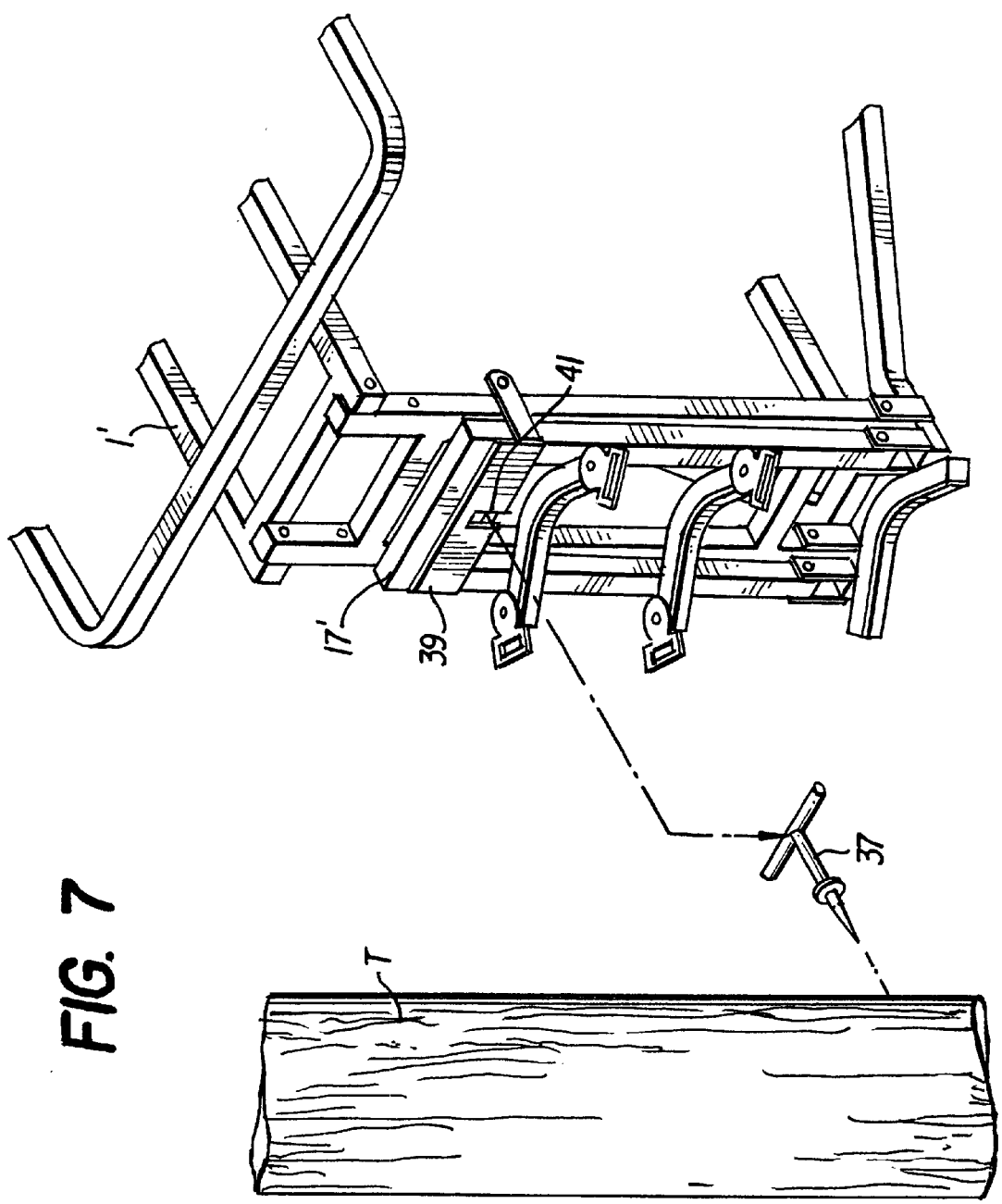
FIG. 7 shows a partial view of a tree stand according to the alternative embodiment and its attachment to a tree trunk with the screw of FIG. 6.

In an alternative embodiment, the tree stand can be attached to the tree in ways other than by use of the tree attachment members 27 For example, FIG. 6 shows a screw 37 designed to be screwed into a tree trunk or limb. The screw 37 can be used with a modified tree stand 1', which is partially shown in FIG. 7. The modified tree stand 1' is like the tree stand 1 of the preferred embodiment, except that a modified jack plate 17' includes a plate 39 with a slot 41 therein. The screw 37 is screwed into the tree trunk or limb T, and then the tree stand 1' is hung from the screw 37 by fitting the plate 39 over the screw 37 to engage the slot 41 with the screw 37.

The stand 1 or 1' can be formed out of tubular steel or another suitable material. The straps 31 and 35 can be formed out of woven nylon or another suitable material and can have any suitable strap adjustment devices.

Figure 8:
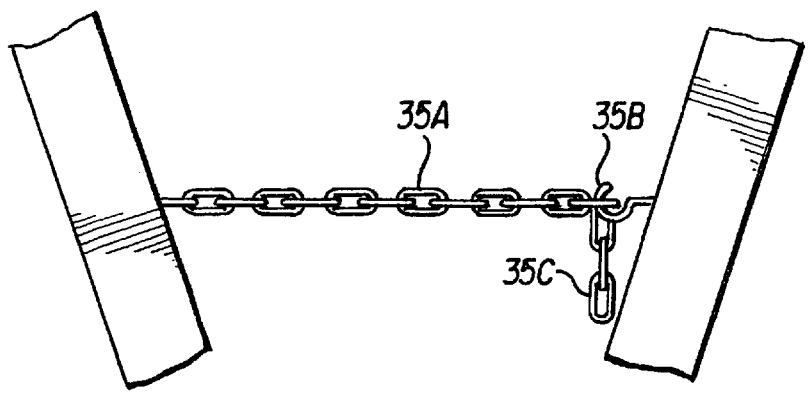
FIG. 8 shows a partial view of a tree stand in which the adjustment strap is replaced with a chain and hook.

While a preferred embodiment and an alternative embodiment of the present invention have been set forth in detail above, those skilled in the art who have reviewed the present disclosure will readily appreciate that other embodiments can be realized within the scope of the present invention For example, the adjustment strap can be replaced as shown in FIG. 8, with a chain 35A and a hook 35B for engaging with a link 35C in the chain 35A selected to give the appropriate angle between the jack plate and the vertical member. Also, the tree attachment members can be supplemented or replaced with any other appropriate members for attaching the jack plate to the tree trunk or limb; such appropriate members include chains or rigid attachment arms. Moreover, while two platforms have been disclosed, more or fewer platforms can be provided. Therefore, the present invention should be construed as limited only by the present claims.

I claim:

1. A stand for being attached to a support, the stand comprising:
   a vertical member;
   at least one platform, attached to the vertical member, which is positionable in a horizontal position when the stand is attached to the support;
   a jack plate, pivotally attached to the vertical member to define an angle between the jack plate and the vertical member; and
   a length-adjustable member for connecting the jack plate to the vertical member and for being adjusted to vary the angle.

2. The stand of claim 1, wherein the length-adjustable member comprises a length-adjustable strap extending between the jack plate and the vertical member.

3. The stand of claim 1, wherein the at least one platform comprises an upper platform and a lower platform, each of which is positionable in the horizontal position when the stand is attached to the support.

4. The stand of claim 3, wherein the upper platform and the lower platform are pivotally attached to the vertical member.

5. The stand of claim 4, wherein the upper platform comprises a bar which is positioned to engage with the vertical member to maintain the upper platform in the horizontal position against gravity.

6. The stand of claim 4, further comprising at least one support cord extending between the vertical member and the lower platform to maintain the lower platform in the horizontal position against gravity.

7. The stand of claim 1, wherein the jack plate comprises a pin which holds the jack plate in parallel with the vertical member, the pin being removable to allow the jack plate to swing out of parallel with the vertical member.

8. The stand of claim 1, wherein the jack plate comprises attachment means for attaching the jack plate to the support.

9. The stand of claim 8, wherein the attachment means comprises:
   an attachment member on the jack plate; and
   a strap attachment to the attachment member.

10. The stand of claim 8, wherein the attachment means comprises:
    a screw; and
    a plate on the jack plate, having a slot proportioned so as to be engaged with the screw.

11. The stand of claim 8, wherein the length-adjustable member comprises means for adjusting the angle independently of a position of the at least one platform relative to the vertical member.

12. The stand of claim 8, wherein the length-adjustable member comprises a length-adjustable strap extending between the jack plate and the vertical member.

13. The stand of claim 1, wherein the length-adjustable member comprises a length-adjustable chain extending between the jack plate and the vertical member.

14. A stand for being attached to a support, the stand comprising:
    a vertical member;
    at least one platform attached to the vertical member;
    a jack plate pivotally attached to the vertical member to define an angle between the jack plate and the vertical member;
    attachment means for attaching the jack plate to the support; and
    a length-adjustable member for connecting the jack plate to the vertical member and for adjusting the angle to maintain the vertical member in a vertical orientation when the support is not in the vertical orientation.

15. The stand of claim 14, wherein the at least one platform extends perpendicularly to the vertical member.

16. The stand of claim 14, wherein the at least one platform is pivotally attached to the vertical member to be movable between a first position in which the at least one platform extends perpendicularly to the vertical member and a second position in which the at least one platform does not extend perpendicularly to the vertical member.

17. The stand of claim 16, wherein the length-adjustable member comprises means for adjusting the angle independently of a position of the at least one platform relative to the vertical member.

18. The stand of claim 14, wherein the length-adjustable member comprises means for adjusting the angle independently of a position of the at least one platform relative to the vertical member.

19. The stand of claim 14, wherein the length-adjustable member comprises a length-adjustable extending between the jack plate and the vertical member.

20. The stand of claim 14, wherein the at least one platform comprises an upper platform and a lower platform.

21. The stand of claim 20, wherein the length-adjustable member comprises means for adjusting the angle independently of a position of either the upper platform or the lower platform relative to the vertical member.

22. The stand of claim 14, wherein the length-adjustable member comprises a length-adjustable chain extending between the jack plate and the vertical member.

* * * * *